(12) United States Patent
Kone (10) Patent No.: US 9,736,737 B2
(45) Date of Patent: Aug. 15, 2017

(54) METHOD OF HANDLING RANDOM ACCESS PROCEDURE WITH DEACTIVATION TIMER

(75) Inventor: Mamadou Kone, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 13/548,229

(22) Filed: Jul. 13, 2012

(65) Prior Publication Data

US 2013/0016659 A1 Jan. 17, 2013

Related U.S. Application Data

(60) Provisional application No. 61/507,127, filed on Jul. 13, 2011.

(51) Int. Cl.
*H04W 74/00* (2009.01)
*H04W 36/00* (2009.01)
*H04W 36/18* (2009.01)
*H04W 74/04* (2009.01)

(52) U.S. Cl.
CPC ..... *H04W 36/0027* (2013.01); *H04W 74/006* (2013.01); *H04W 36/18* (2013.01); *H04W 74/04* (2013.01)

(58) Field of Classification Search
CPC . H04W 36/0011; H04W 36/08; H04W 36/14; H04W 36/36165; H04W 36/0027; H04W 36/0055; H04W 36/0088; H04W 74/04; H04W 74/006; H04L 29/06
USPC .......................... 370/328, 331; 455/436, 443
See application file for complete search history.

(56) References Cited

U.S. PATENT DOCUMENTS

| | | | | |
|---|---|---|---|---|
| 2008/0049671 A1* | 2/2008 | Koo et al. | | 370/329 |
| 2011/0211617 A1* | 9/2011 | Li et al. | | 375/146 |
| 2011/0243048 A1* | 10/2011 | Wang et al. | | 370/311 |
| 2012/0082107 A1* | 4/2012 | Ou | H04W 74/0833 | 370/329 |
| 2012/0243514 A1* | 9/2012 | Wu | H04W 74/0833 | 370/336 |
| 2012/0281680 A1* | 11/2012 | Bostrom | H04L 5/0051 | 370/336 |
| 2012/0294213 A1 | 11/2012 | Chen | | |

(Continued)

FOREIGN PATENT DOCUMENTS

| CN | 102036411 A | 4/2011 |
|---|---|---|
| CN | 102088433 A | 6/2011 |

(Continued)

OTHER PUBLICATIONS

3GPP TS 36.321 v10.0.0 (Jan. 2011).*

(Continued)

*Primary Examiner* — Michael Thier
*Assistant Examiner* — Brian Cox
(74) *Attorney, Agent, or Firm* — Winston Hsu (57) ABSTRACT

A method of handling random access procedure on secondary cell in a wireless communication system is disclosed. The method comprises starting a deactivation timer for a secondary cell, performing a random access procedure for the secondary cell, and when the deactivation timer expires during the random access procedure, aborting the random access procedure or completing the random access procedure unsuccessfully.

10 Claims, 6 Drawing Sheets

(56) References Cited

U.S. PATENT DOCUMENTS

2013/0250902 A1    9/2013    Xu
2014/0016623 A1*    1/2014    Bai et al. ............. 370/336

FOREIGN PATENT DOCUMENTS

CN    102118722 A    7/2011
TW    201216757    4/2012

OTHER PUBLICATIONS

3GPP TS 36.300 v10.0.0 (Jun. 2010).*
R2-113578 3GPP TSG-WG2 Meeting #74 Updates of Carrier Aggregation agreements (WI R2-110451), May 9, 2011.
European patent application No. 12005182.6, European Search Report mailing date: Dec. 12, 2012.
3GPP TS 36.321 V10.2.0 (Jun. 2011), "3rd Generation Partnership Project; Technical Specification Group Radio Access Network; Evolved Universal Terrestrial Radio Access (E-UTRA); Medium Access Control (MAC) protocol specification(Release 10) ", XP050539118, pp. 1-54.
Ericsson, ST-Ericsson, "Corrections to the Carrier Aggregation functionality in MAC", 3GPP TSG-RAN2 Meeting #72bis, R2-110664, Jan. 17-21, 2011, Dublin, Ireland, XP050493140.
InterDigital Communications, "Release of PUCCH resources and removal of SCell Configuration", 3GPP TSG-RAN WG2 #71, Tdoc R2-104814, Aug. 23-27, 2010, Madrid, Spain, XP050451955, pp. 1-11.
Fujitsu, "Handling of UE deactivation tinier", 3GPP TSG-RAN WG2 Meeting #72, R2-106395, Nov. 15-19, 2010, Jacksonville, USA, XP050466607.
InterDigital Communications, "Report of Email discussion #26 on SCell Activation in LTE CA", 3GPP TSG-RAN WG2 #73, Tdoc R2-111384, Feb. 21-25, 2011, Taipei, Taiwan, XP050605673, pp. 1-10.
HTC, "SCell deactivation during random access procedure", 3GPP TSG-RAN WG2 Meeting #77bis, R2-121833, Mar. 26-30, 2012, Jeju, South Korea, XP050606063.
ETSI TS 136 300 V10.2.0 (Jan. 2011) LTE; Evolved Universal Terrestrial Radio Access (E-UTRA) and Evolved Universal Terrestrial Radio Access Network (E-UTRAN); Overall description; Stage 2, (3GPP TS 36.300 version 10.2.0 Release 10), cover page and p. 93.
Etsi Ts 136 321 V10.0.0 (2011-01) Lte; Evolved Universal Terrestrial Radio Access (E-Utra); Medium Access Control (Mac) protocol specification, (3GPP Ts 36.321 version 10.0.0 Release 10), cover p., and p. 32-33.
Office action mailed on Jul. 9, 2014 for the Taiwan application No. 101125391, filing date: Jul. 13, 2012, p. 1-7.
Office action mailed on Aug. 5, 2014 for the China application No. 201210244708.2, filed Jul. 13, 2012.
Office action mailed on Feb. 9, 2015 for the China application No. 201210244708.2, filing date: Jul. 13, 2012, p. 1-9.
ZTE, "Remaining issues related to CA during random access procedure in LTE-A", 3GPP TSG-RAN WG1 #65, R1-111507, Barcelona, Spain, May 9-May 13, 2011.

* cited by examiner

METHOD OF HANDLING RANDOM ACCESS PROCEDURE WITH DEACTIVATION TIMER

CROSS REFERENCE TO RELATED APPLICATIONS

This application claims the benefit of U.S. Provisional Application No. 61/507,127, filed on Jul. 13, 2011 and entitled "Methods for UE to handle network triggering of RACH on SCell while ScelldeactivationTimer is running", the contents of which are incorporated herein in their entirety.

BACKGROUND OF THE INVENTION

1. Field of the Invention

The application relates to a method utilized in a wireless communication system, and more particularly, to a method of handling random access procedure with deactivation timer in a wireless communication system.

2. Description of the Prior Art

Toward advanced high-speed wireless communication system, such as transmitting data in a higher peak data rate, LTE-Advanced system is standardized by the 3rd Generation Partnership Project (3GPP) as an enhancement of LTE system. LTE-Advanced system targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation is introduced to the LTE-Advanced system for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple component carriers for simultaneously receiving and transmitting. In carrier aggregation, the UE only has one RRC connection with the network. At RRC connection establishment/re-establishment/handover, one serving cell provides the NAS mobility information, and at RRC connection re-establishment/handover, one serving cell provides the security input. This cell is referred to as a primary cell (PCell). In the downlink, the component carrier corresponding to the PCell is the Downlink Primary Component Carrier (DL PCC) while in the uplink it is the Uplink Primary Component Carrier (UL PCC). In addition, cells other than the PCell are named secondary cell (SCell).

Note that, the PCell (i.e. the UL and DL PCC) is always activated, whereas the SCell may be activated or deactivated according to specific conditions (e.g. an amount of data for transmission). The UE shall not monitor the physical downlink control channel (PDCCH) of a deactivated SCell and shall not receive any downlink assignments or uplink grants associated to a deactivated SCell. The UE shall not transmit on UL-SCH on a deactivated SCell. In addition, the network activates and deactivates the SCell by sending the Activation/Deactivation command. Moreover, the UE starts a deactivation timer for the SCell when the SCell is activated, wherein the SCell is deactivated when the deactivation timer expires.

According to the prior art, it is possible to configure a UE of a PCell and one SCell or more SCells. Therefore, multiple timing alignments, each for synchronization with a serving base station on uplink timing for preventing signals transmitted from the UE from colliding with those sent from other UEs under the coverage of the base station, are needed for PCell and SCell or more SCells in different bands. Note that, serving cells having uplink to which the same timing alignment applies are grouped in a timing alignment group. Each timing alignment group contains at least one serving cell with configured UL, and the mapping of each serving cell to a timing alignment group is configured by the serving eNB. To obtain initial UL time alignment for a SCell not group together with the PCell, eNB initiated random access (RA) procedure may be used. This RA procedure may be initiated via a PDCCH order for an activated SCell. This PDCCH order is sent on the scheduling cell of this SCell. In addition, at least a non-contention based RA procedure will be supported.

As abovementioned, the network (i.e. eNB) triggers RA procedure on a SCell with the PDCCH order, and the PDCCH order triggered RA procedure is a non-contention RA procedure. In other words, the Message 0 of non-contention RA procedure will be sent on the scheduling cell for a SCell, and the Message 1 is sent on the UL of the SCell. However, there is no guideline of how to handle the SCell deactivation timer during the RA procedure. If the SCell deactivation timer expires while the RA procedure is not terminated, the SCell will be deactivated and the UE is not prepared to that possibility.

SUMMARY OF THE INVENTION

The application discloses a method of handling random access procedure with deactivation timer in a wireless communication system to solve the abovementioned problems.

A method of handling random access procedure with deactivation timer in a wireless communication system is disclosed. The method comprises starting a deactivation timer for a secondary cell, performing a random access procedure for the secondary cell, and aborting the random access procedure when the deactivation timer expires during the random access procedure.

A method of handling random access procedure with deactivation timer in a wireless communication system is disclosed. The method comprises starting a deactivation timer for a secondary cell, performing a random access procedure for the secondary cell, and completing the random access procedure unsuccessfully when the deactivation timer expires during the random access procedure.

A method of handling random access procedure with deactivation timer in a wireless communication system is disclosed. The method comprises starting a deactivation timer for a secondary cell, performing a random access procedure for the secondary cell, and stopping the deactivation timer at the start of the random access procedure.

A method of handling random access procedure with deactivation timer in a wireless communication system is disclosed. The method comprises starting a deactivation timer for a secondary cell, performing a random access procedure for the secondary cell, and restarting the deactivation timer for maintaining the secondary cell activated during the random access procedure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
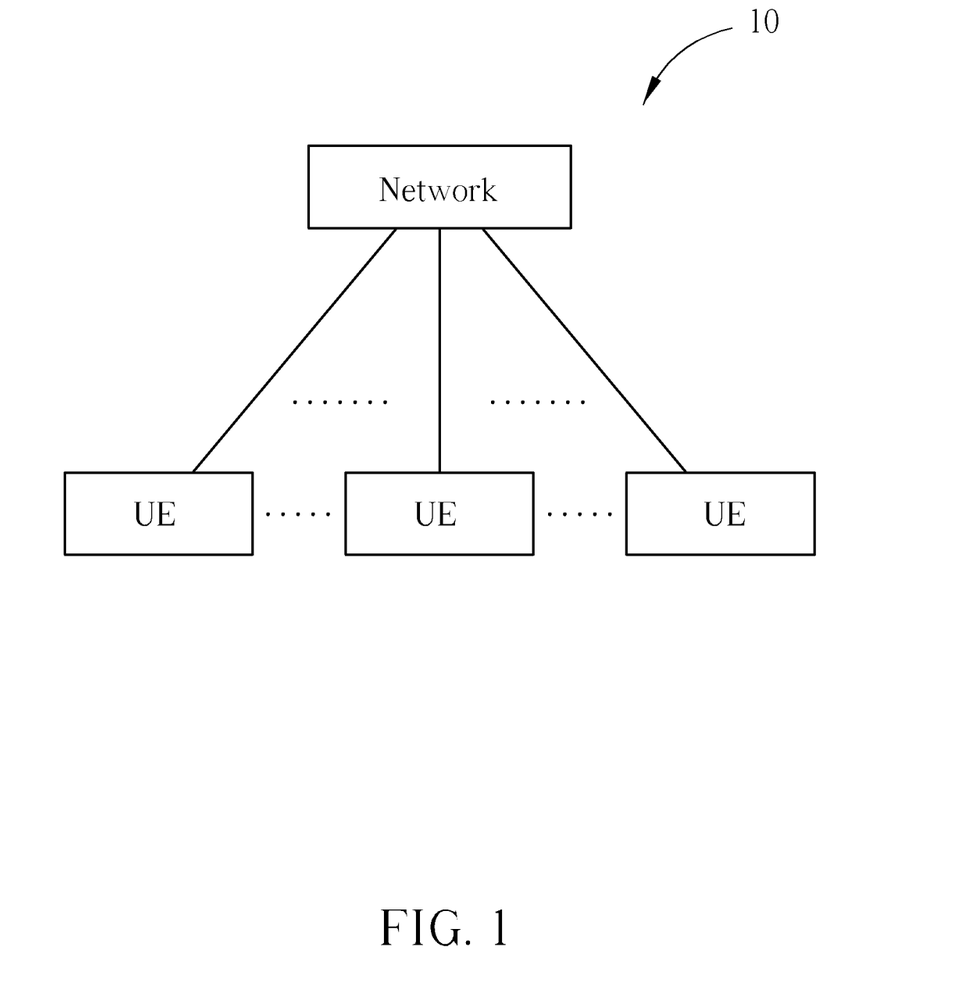
FIG. 1 illustrates a schematic diagram of an exemplary wireless communication system.

Please refer to FIG. 1, which is a schematic diagram of a wireless communication system 10. The wireless communication system 10 is a Long-Term Evolution advanced (LTE-Advanced) system or other mobile communication systems, and is briefly composed of a network and a plurality of user equipments (UEs). In FIG. 1, the network and the UEs are simply utilized for illustrating the structure of the wireless communication system 10. Practically, the network may be an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
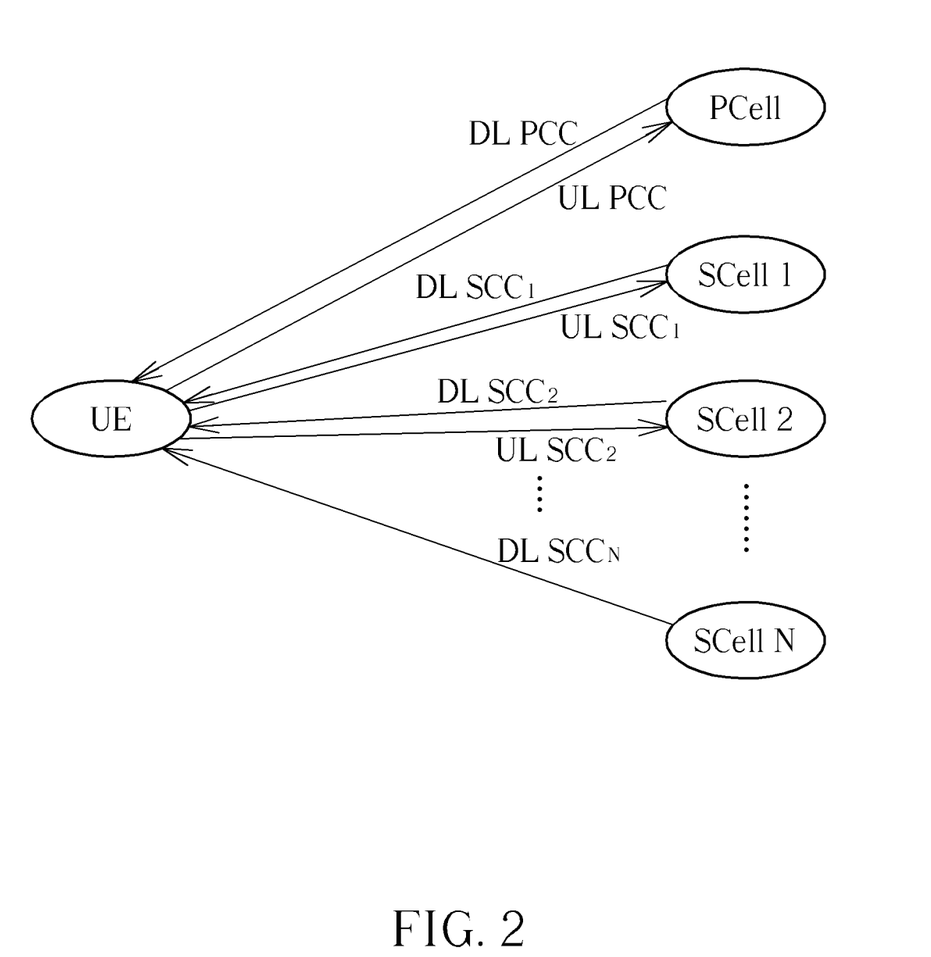
FIG. 2 is a schematic diagram of a user equipment and multiple cells in a wireless communication system in FIG. 1.

Please refer to FIG. 2, which is a schematic diagram of a UE and multiple cells in the wireless communication system 10. The UE communicates with one primary cell (PCell) and several secondary cells (SCells), as SCell 1-SCell N shown in FIG. 2. In the downlink, the component carrier corresponding to the PCell is the downlink primary component carrier (DL PCC) while in the uplink it is the uplink primary component carrier (UL PCC). Depending on UE capabilities, SCells can be configured to form together with the PCell a set of serving cells. In the downlink, the component carrier corresponding to a SCell is a downlink secondary component carrier (DL SCC) while in the uplink it is an uplink secondary component carrier (UL SCC).

Figure 3:
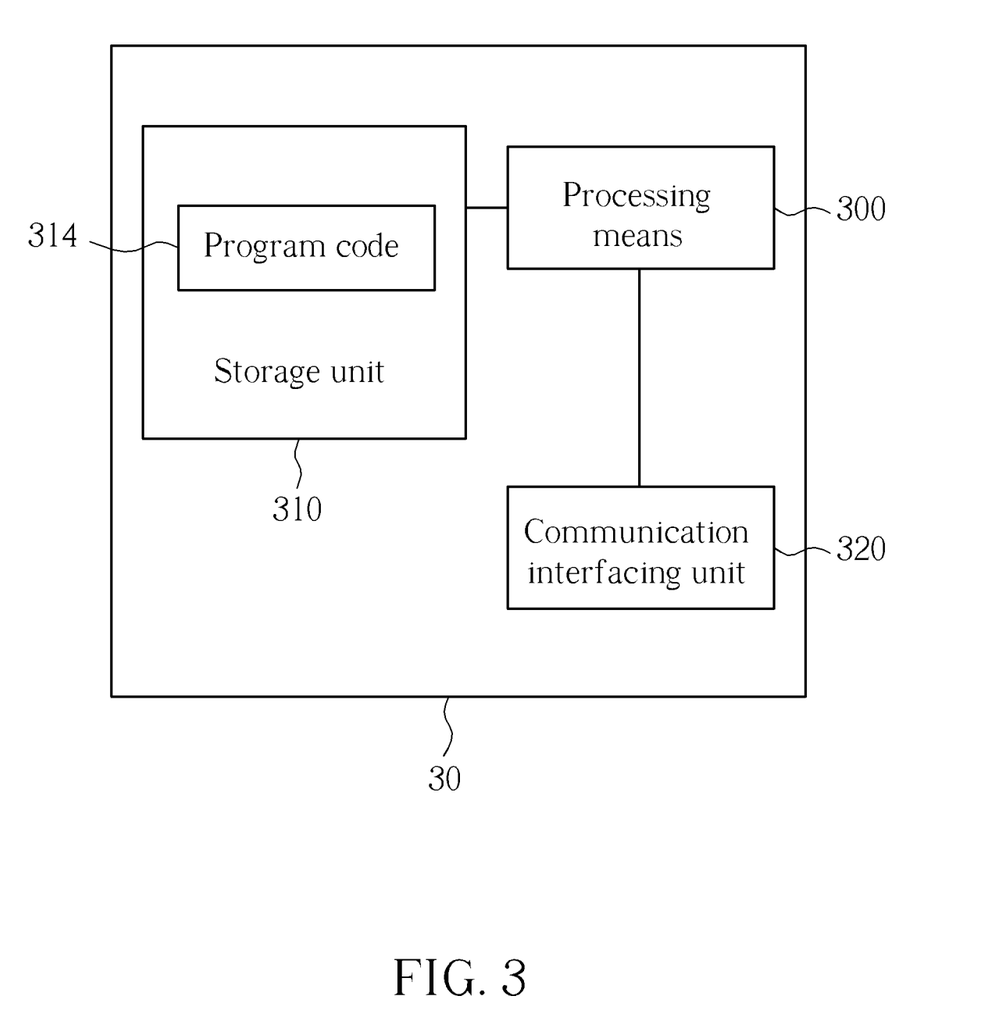
FIG. 3 illustrates a schematic diagram of an exemplary communication device.

FIG. 3 illustrates a schematic diagram of an exemplary communication device. The communication device 30 can be the UE shown in FIG. 1, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that can store program code 314, for access by the processing means 300. Examples of the storage unit 310 include but are not limited to a subscriber identity module (SIM), read-only memory (ROM), flash memory, random-access memory (RAM), CD-ROMs, magnetic tape, hard disk, and optical data storage device. The communication interfacing unit 320 is preferably a radio transceiver and can exchange wireless signals with the network (i.e. PCell or SCell 1-SCell N) according to processing results of the processing means 300.

Figure 4:
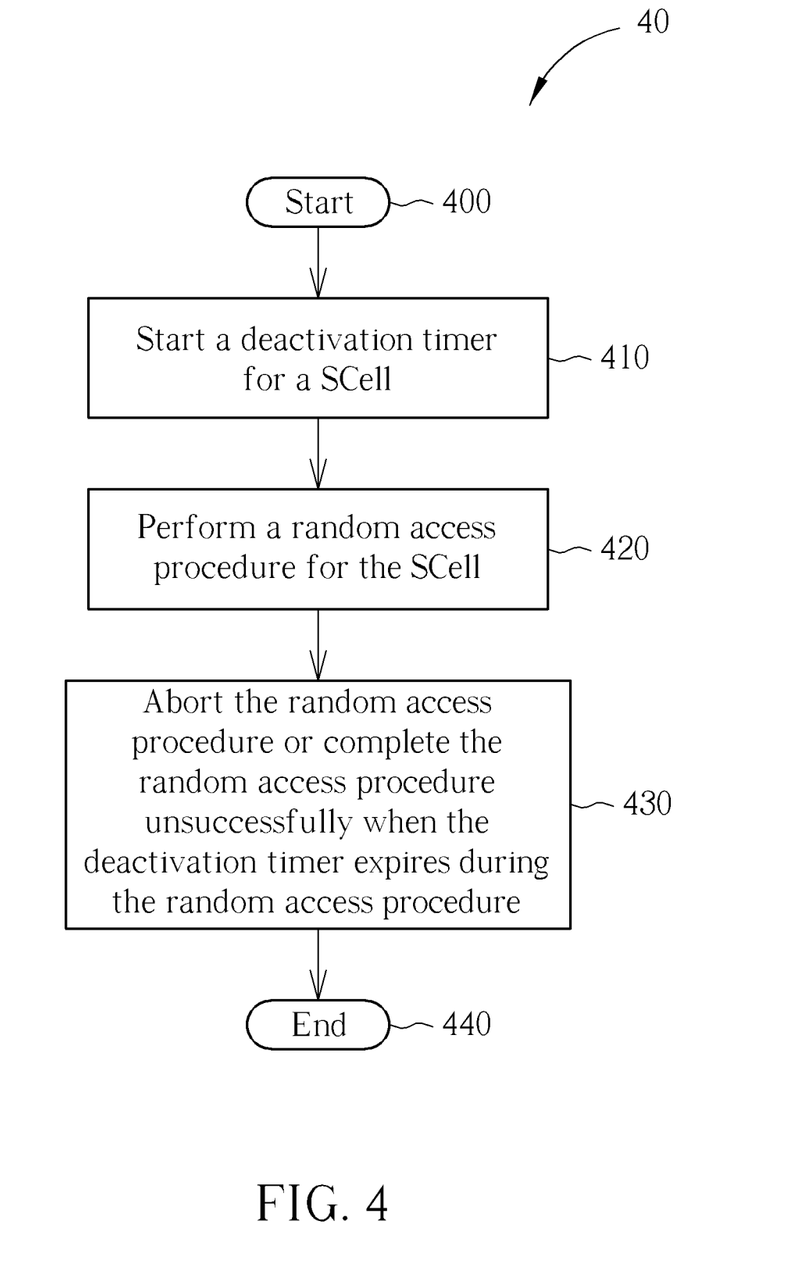
FIG. 4 is a flowchart of an exemplary process.

Please refer to FIG. 4, which illustrates a flowchart of an exemplary process 40. The process 40 is utilized in a UE for handling random access procedure on SCell with deactivation timer running. The process 40 can be compiled into the program code 314 and includes the following steps:

Step 400: Start.

Step 410: Start a deactivation timer for a SCell.

Step 420: Perform a random access procedure for the SCell.

Step 430: Abort the random access procedure or complete the random access procedure unsuccessfully when the deactivation timer expires during the random access procedure.

Step 440: End.

According to the process 40, when the UE performs the random access procedure for the SCell and the deactivation timer for the SCell expires during the random access procedure, the UE either abandons the random access procedure or completes the random access procedure unsuccessfully.

Take an example based on the process 40. Referring back to FIG. 2, the UE is configured with the PCell, and SCell 1-N. When the UE receives an activation command for activating the SCell 1 from the network, the UE starts a deactivation timer for the SCell 1. Meanwhile, the UE receives a PDCCH order on a scheduling cell (i.e. SCell 2) for the SCell 1, from the network, and thereby performs a random access procedure. The UE abandons the random access procedure or complete the random access procedure unsuccessfully if the deactivation timer expires during the random access procedure. Note that, the PDCCH order includes a dedicated random access preamble for initiation of the random access procedure.

In an embodiment, the deactivation timer for the Scell expires before reception of a random access response of the random access procedure, and the UE shall abort the random access procedure and deactivates the SCell. In other embodiment, the deactivation timer for the SCell expires before reception of a random access response of the random access procedure, and the UE shall complete the random access procedure unsuccessfully. After that, the network (i.e. eNB) should activate the SCell with the activation command. As a result, the UE restarts the random access procedure for the SCell when the SCell is activated by the network and after reception of another PDCCH order for the random access procedure initiation for the SCell.

Figure 5:
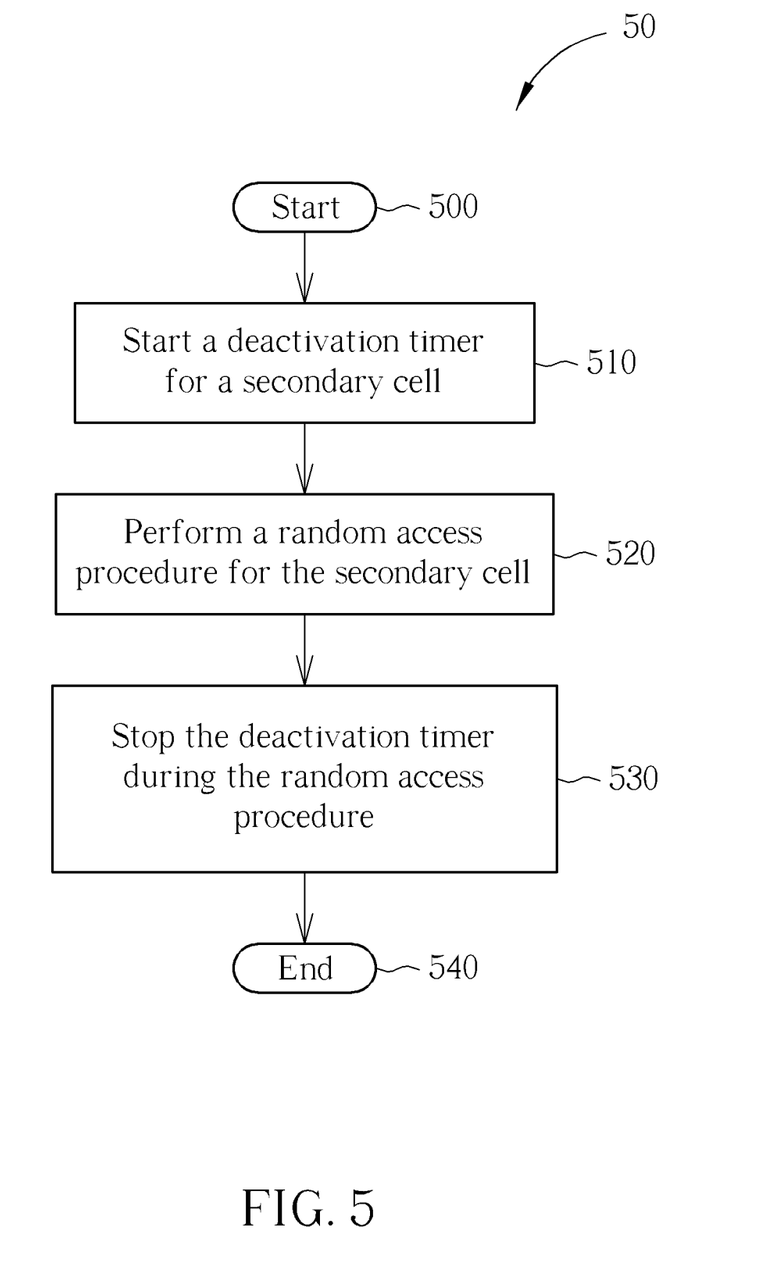
FIG. 5 is a flowchart of an exemplary process.

Please refer to FIG. 5, which illustrates a flowchart of an exemplary process 50. The process 50 is utilized in a UE for handling random access procedure on SCell with deactivation timer running. The process 50 can be compiled into the program code 314 and includes the following steps:

Step 500: Start.

Step 510: Start a deactivation timer for a secondary cell.

Step 520: Perform a random access procedure for the secondary cell.

Step 530: Stop the deactivation timer during the random access procedure.

Step 540: End.

According to the process 50, when the UE performs the random access procedure for the SCell while the deactivation timer is running, the UE stops the deactivation timer during the random access procedure or at the start of the random access procedure.

Take an example based on the process 50. Referring back to FIG. 2, the UE is configured with the PCell, and SCell 1-N. When the UE receives an activation command for activating the SCell 1 from the network, the UE starts a deactivation timer for the SCell 1. Meanwhile, the UE receives a PDCCH order on a scheduling cell (i.e. SCell 2) for the SCell 1, from the network, and thereby performs a random access procedure. In this situation, the UE stops the deactivation timer during the random access procedure or at the start of the random access procedure. Note that, the PDCCH order includes a dedicated random access preamble for initiation of the random access procedure.

In an embodiment, the deactivation timer of the Scell is stopped after the UE receives the PDCCH order for a random access preamble (i.e. Message 0 of the random access procedure) on the scheduling cell. In addition, the UE should ignore any activation/deactivation command for activation or re-activating the SCell during the random access procedure, so as to avoid starting the deactivation timer, which may cause the deactivation timer expired again.

Note that, the UE may restart the deactivation timer for the Scell after the PDCCH/PDSCH for a random access response including uplink timing alignment (Message 2 of the random access procedure) is received. Or, the UE may restart the deactivation timer for the SCell after an uplink transmission of a Message 1 containing the random access preamble is transmitted.

Figure 6:
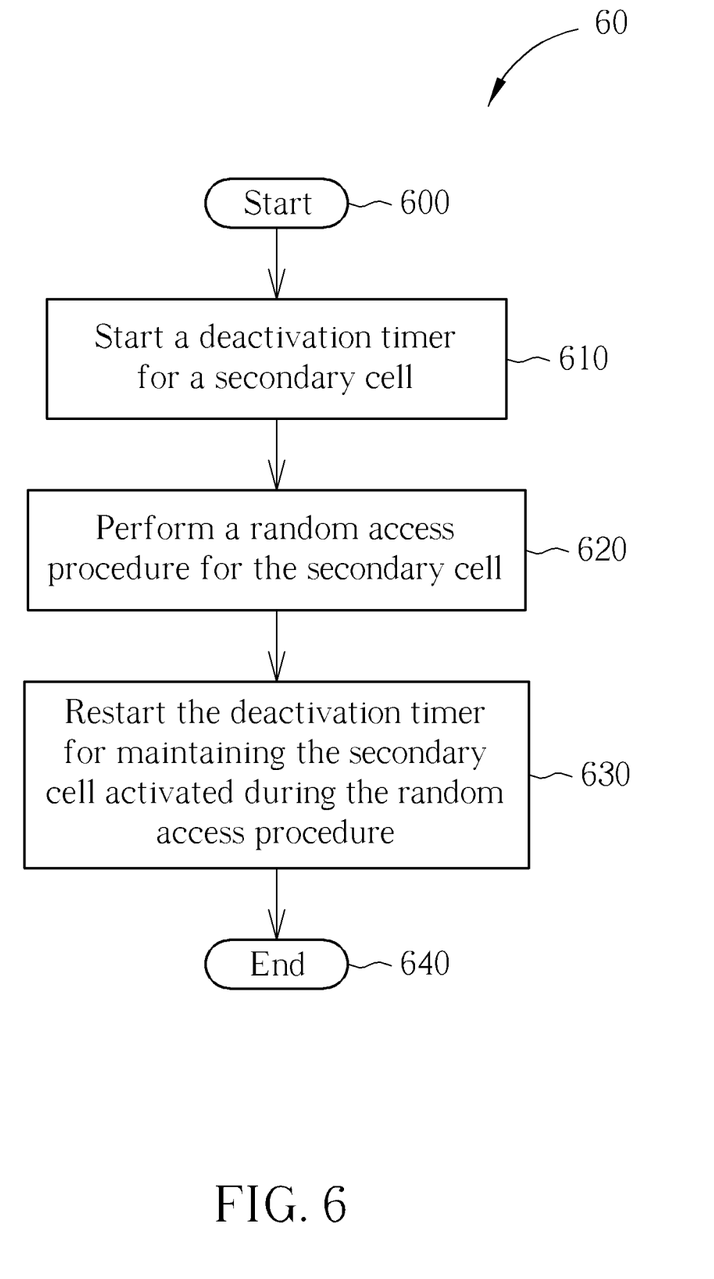
FIG. 6 is a flowchart of an exemplary process.

Please refer to FIG. 6, which illustrates a flowchart of an exemplary process 60. The process 60 is utilized in a UE for handling random access procedure on SCell with deactivation timer running. The process 60 can be compiled into the program code 314 and includes the following steps:

Step 600: Start.
Step 610: Start a deactivation timer for a secondary cell.
Step 620: Perform a random access procedure for the secondary cell.
Step 630: Restart the deactivation timer for maintaining the secondary cell activated during the random access procedure.
Step 640: End.

According to the process 60, when the UE performs the random access procedure for the SCell while the deactivation timer is running, the UE restarts the deactivation timer for keeping the secondary cell in activation during the random access procedure.

Take an example based on the process 60. Referring back to FIG. 2, the UE is configured with the PCell, and SCell 1-N. When the UE receives an activation command for activating the SCell 1 from the network, the UE starts a deactivation timer for the SCell 1. Meanwhile, the UE receives a PDCCH order on a scheduling cell (i.e. SCell 2) for the SCell 1, from the network, and thereby performs a random access procedure. In this situation, the UE restarts the deactivation timer for maintaining the secondary cell activated during the random access procedure. In a word, the SCell 1 should remain activated during the period of the random access procedure.

Note that, if the deactivation timer for the SCell 1 expires before the reception of a random access response of the random access procedure, the UE aborts the random access procedure and deactivates the SCell 1.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the present invention provides methods for handling random access procedure on a secondary cell with a deactivation timer. The UE lets the deactivation timer expired and abandons the random access procedure or completes the random access procedure unsuccessfully, stopped or restarted the deactivation timer during the random access procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling random access procedure on secondary cell for a mobile device in a wireless communication system, the method comprising:
    starting a deactivation timer for a secondary cell, wherein the deactivation timer is started when the secondary cell is activated;
    performing a random access procedure for obtaining uplink time alignment for the secondary cell;
    when the deactivation timer for the secondary cell expires during the random access procedure for the secondary cell, deactivating the secondary cell; and
    when the deactivation timer for the secondary cell expires during the random access procedure for the secondary cell, aborting the random access procedure or completing the random access procedure unsuccessfully.

2. The method of claim 1, wherein performing the random access procedure for the secondary cell comprises:
    receiving a physical downlink control channel (PDCCH) order for the random access procedure initiation for the secondary cell, from a network of the wireless communication system.

3. The method of claim 2, further comprising:
    restarting the random access procedure for the secondary cell only when the secondary cell is activated by the network and after reception of another PDCCH order for the random access procedure initiation for the secondary cell.

4. The method of claim 1, wherein the random access procedure is aborted when the deactivation timer expires before reception of a random access response (RAR) of the random access procedure.

5. The method of claim 1, wherein the random access procedure is completed unsuccessfully when the deactivation timer expires before reception of a random access response (RAR) of the random access procedure.

6. A mobile device of a wireless communication system being configured with at least one secondary cell, the mobile device comprising:
    a processor, for executing a program; and
    a storage unit, coupled to the processor for storing the program;
    wherein the program instructs the processor to perform the following steps:
        starting a deactivation timer for the secondary cell, wherein the deactivation timer is started when the secondary cell is activated;
        performing a random access procedure for obtaining uplink time alignment for the secondary cell;
        when the deactivation timer for the secondary cell expires during the random access procedure for the secondary cell, deactivating the secondary cell; and
        when the deactivation timer for the secondary cell expires during the random access procedure for the secondary cell, aborting the random access procedure or completing the random access procedure unsuccessfully.

7. The mobile device of claim 6, wherein performing the random access procedure for the secondary cell comprises:
    receiving a physical downlink control channel (PDCCH) order for the random access procedure initiation for the secondary cell, from a network of the wireless communication system.

8. The mobile device of claim 7, wherein the program further instructs the processor to perform the following step:
   restarting the random access procedure for the secondary cell only when the secondary cell is activated by the network and after reception of another PDCCH order for the random access procedure initiation for the secondary cell.

9. The mobile device of claim 6, wherein the random access procedure is aborted when the deactivation timer expires before reception of a random access response (RAR) of the random access procedure.

10. The mobile device of claim 6, wherein the random access procedure is completed unsuccessfully when the deactivation timer expires before reception of a random access response (RAR) of the random access procedure.

* * * * *